(12) United States Patent
Skans et al.

(10) Patent No.: US 9,536,154 B2
(45) Date of Patent: Jan. 3, 2017

(54) MONITORING METHOD AND CAMERA (71) Applicant: Axis AB, Lund (SE)

(72) Inventors: Markus Skans, Staffanstorp (SE); Anders Johannesson, Hollviken (SE); Jiandan Chen, Lund (SE); Joakim Baltsen, Malmo (SE)

(73) Assignee: Axis AB, Lund (SE)

( * ) Notice: Subject to any disclaimer, the term of this patent is extended or adjusted under 35 U.S.C. 154(b) by 436 days.

(21) Appl. No.: 14/273,181

(22) Filed: May 8, 2014

(65) Prior Publication Data

US 2014/0334676 A1 Nov. 13, 2014

(30) Foreign Application Priority Data

May 8, 2013 (EP) ..................................... 13167014

(51) Int. Cl.
*G06K 9/00* (2006.01)
*G08B 13/196* (2006.01)
*G06K 9/20* (2006.01)
*G06K 9/62* (2006.01)
*G06T 7/20* (2006.01)

(52) U.S. Cl.
CPC ....... *G06K 9/00771* (2013.01); *G06K 9/00369* (2013.01); *G06K 9/2036* (2013.01); *G06K 9/2054* (2013.01); *G06K 9/6201* (2013.01); *G06T 7/2093* (2013.01); *G08B 13/19652* (2013.01); *G08B 13/19686* (2013.01); *G06T 2207/10016* (2013.01);
(Continued)

(58) Field of Classification Search
None
See application file for complete search history.

(56) References Cited

U.S. PATENT DOCUMENTS 5,574,511 A 11/1996 Yang et al.
7,167,575 B1 * 1/2007 Nichani ............. G08B 13/1961
348/143
(Continued)

FOREIGN PATENT DOCUMENTS

WO WO/2009010550 1/2009

OTHER PUBLICATIONS

Extended European search report dated Oct. 7, 2013 issued in EP Application No. 13167014.3-1901.

*Primary Examiner* — Nancy Bitar
(74) *Attorney, Agent, or Firm* — Oblon, McClelland, Maier & Neustadt, L.L.P.

(57) ABSTRACT

A method of monitoring a scene by a camera (7) comprises marking a part (14) of the scene with light having a predefined spectral content and a spatial verification pattern. An analysis image is captured of the scene by a sensor sensitive to the predefined spectral content. The analysis image is segmented based on the predefined spectral content, to find a candidate image region. A spatial pattern is detected in the candidate image region, and a characteristic of the detected spatial pattern is compared to a corresponding characteristic of the spatial verification pattern. If the characteristics match, the candidate image region is identified as a verified image region corresponding to the marked part (14) of the scene. Image data representing the scene is obtained, and image data corresponding to the verified image region is processed in a first manner, and remaining image data is processed in a second manner.

13 Claims, 2 Drawing Sheets

(52) U.S. Cl.
CPC ............ *G06T 2207/20112* (2013.01); *G06T 2207/30196* (2013.01); *G06T 2207/30232* (2013.01)

(56) References Cited

U.S. PATENT DOCUMENTS

| | | |
|---|---|---|
| 8,311,275 B1 | 11/2012 | Berlic et al. |
| 2001/0028697 A1* | 10/2001 | Nahaliel ............... A61B 6/032 378/19 |
| 2002/0125435 A1 | 9/2002 | Cofer et al. |
| 2003/0063191 A1 | 4/2003 | Challapali et al. |
| 2004/0256541 A1 | 12/2004 | Cofer et al. |
| 2005/0157169 A1* | 7/2005 | Brodsky ............... G01S 3/7864 348/143 |
| 2005/0285966 A1 | 12/2005 | Bamji et al. |
| 2009/0251685 A1 | 10/2009 | Bell |
| 2010/0067738 A1* | 3/2010 | Petricoin, Jr. ......... G06T 7/0042 382/103 |
| 2010/0302376 A1 | 12/2010 | Boulanger et al. |

\* cited by examiner

MONITORING METHOD AND CAMERA

TECHNICAL FIELD

The present invention relates to a camera and a method of monitoring a scene.

BACKGROUND

Cameras are used in many different applications, both indoors and outdoors, to monitor a variety of environments. In certain situations there may be a need to treat one part of a captured image different from another part, such as when a building with windows is monitored and there is a need to avoid monitoring the inside of the building through the window. In such an instance, a privacy mask may be defined by marking the window to be masked on the image in a graphical user interface. For a camera which is able to pan, tilt and/or zoom, the privacy mask may be defined in a PTZ coordinate system.

Another example of when there is a need to mark a part of an image is in a situation where a camera should detect movement only in a selected area of the image and ignore any motion in the rest of the image. This is usually solved by an operator selecting, e.g. by marking an image area in a user interface, which part of the image, such as the higher or lower part, should be removed from motion detection.

However, improvements in this area are still of interest.

SUMMARY OF THE INVENTION

It is an object of the present invention to provide an improved way of selecting a part of an image for certain types of processing.

According to a first aspect of the invention a method of monitoring a scene by a camera comprises the steps of marking a part of the scene with light having a predefined spectral content and a spatial verification pattern, capturing an analysis image of the scene by a sensor sensitive to the predefined spectral content, segmenting the analysis image, based on the predefined spectral content, to find a candidate image region, detecting a spatial pattern in the candidate image region, comparing a characteristic of the detected spatial pattern to a corresponding characteristic of the spatial verification pattern, and, if the characteristics match, identifying the candidate image region as a verified image region corresponding to the marked part of the scene, obtaining image data representing the scene, and processing image data corresponding to the verified image region in a first manner, and processing remaining image data in a second manner.

In this way it is possible to define a region of an image, where image data should be treated differently to the rest of the image, in a flexible and simple manner which is also resistant to tampering. This method provides at least one significant difference to the prior art ways of marking a portion of an image such as by selecting an image portion in a user interface—the marking according to the inventive method is instead physically defined in the scene in itself. It therefore provides a more flexible definiton of a marked area since a depth parameter may be taken into account, e.g. by mounting a light source at an appropriate position in the scene.

The method is e.g. useful in a situation where it is desired to hide a part of a scene which is at some distance from the camera, such as the inside of a store, while alllowing the camera to see things that happen between the masked part and the camera, i.e. the area outside the store. In practice, this could e.g. be achieved by mounting a light source at the store entrance door.

In a situation where the marking is used to create a privacy mask, the spatial verification pattern reduces the risk of "false" markings of the scene being created, such as if an intruder would try to mask out a part of the image to hide his actions. Even if an intruder would use a torch light having the correct spectral content to try to create a non-operator defined privacy, it would be very difficult for him to copy the spatial verification pattern.

The image data may be obtained from the analysis image or, as an alternative, the method may further comprise the step of capturing a monitoring image by a sensor insensitive to the predefined spectral content, and obtaining the image data from the monitoring image. The latter alternative is e.g. useful when it is not desired to include the predefined spectral content in an image shown to a user.

The method may further comprise the steps of modulating the spatial verification pattern between at least a first and a second spatial verification pattern, according to a temporal modulation sequence, and, with a respective one of the first and the second spatial verification pattern, in accordance with the temporal modulation sequence, repeating the steps of marking, capturing, segmenting, detecting and comparing.

This also helps to enhance security, reduce the risk of tampering and reduce the risk of the camera mistaking a non-marked area of the scene for a marked or vice versa.

The characteristic of the detected spatial pattern may be a ratio between a spatial frequency of the detected pattern and a spatial frequency of a previously detected pattern, and the characteristic of the spatial verification pattern may be a ratio between a spatial frequency of the first spatial verification pattern and a spatial frequency of the second spatial verification pattern. This improves the robustness and efficiency of the method and makes it possible to compare smaller patches of pixels in the candidate image regions. It also solves the potential problem of the spatial pattern on objects in the scene appearing to look different depending on their distance from the monitoring camera and the light source.

The temporal modulation sequence may be generated based on a pseudo-random sequence to even further enhance the security of the method in a simple and efficient manner.

The spatial verification pattern may be a signature pattern associated with one or more cameras. In this way a camera used for monitoring purposes may be delivered with a light source tailored to that specific camera, and the camera is configured to process in the first manner only those areas in the scene which are marked with the specific signature pattern of that camera. This further enhances the security, especially when the marking is used for privacy mask purposes.

The spatial verification pattern acting as a signature pattern for more than one camera is useful in a situation where a group of cameras are set to monitor the same scene and the same part of the scene should be marked for all of the cameras. In this case the time required to inform the camera of a marked part of the scene will also be reduced compared to a case where an operator defines a marked part of a scene for each single camera by defining coordinates in the field of view for each camera.

The first manner of processing may comprise hiding image data corresponding to the verified image region from being displayed, such as by blurring or substituting, thereby providing a privacy mask for the marked part of the scene. As mentioned above, this is useful e.g. when it is desired to hide the interior of a shop while allowing the exterior to be monitored. As an alternative, the second manner of processing may comprise hiding remaining image data from being displayed, such as by blurring or substituting, thereby displaying only the marked part of the scene. This is useful when it is desired to monitor only objects that are in the vicinity of the camera, such as persons withdrawing money from an ATM and anyone close by, while ignoring the surroundings.

A stored background image may be used for the substituting. This gives a user-friendly experience to the operator by providing an image where the position of objects of interest is easily recognized.

The first manner of processing may comprise including image data corresponding to the verified image region in input to a motion detection unit, and the second manner of processing may comprise excluding the remaining image data from input to the motion detection unit.

As an alternative, the second manner of processing may comprise including the remaining image data in input to a motion detection unit, and the first manner of processing may comprise excluding the image data corresponding to the verified image region from input to the motion detection unit.

The first manner of processing may comprise including image data corresponding to the verified image region in input to an object detection unit arranged to detect or identify a human, an animal, a vehicle, a license plate, text or visual information, or other object type, and the second manner of processing may comprise excluding the remaining image data from input to the object detection unit, or, the second manner of processing may comprise including the remaining image data, in input to an object detection unit arranged to detect or identify a human, an animal, a vehicle, a license plate, text or visual information, or other object type, and the first manner of processing may comprise excluding the image data corresponding to the verified image region from input to the object detection unit.

All of these alternatives, in combination or alone, provide the opportunity to tailor the monitoring to the specifics of the scene monitored in a flexible and simple manner.

The first manner of processing may comprise compressing image data representing the verified image region at a first compression rate, and the second manner of processing may comprise compressing remaining image data at a second compression rate, wherein the first compression rate is different to the second compression rate.

In this way it is possible to save bandwidth by transmitting or saving those parts of the image which are deemed to be less interesting at a higher compression rate.

According to a second aspect of the invention a camera arranged to monitor a scene comprises a sensor arranged to sense a predefined spectral content and capture an analysis image of a scene, an image processing unit arranged to segment the analysis image, based on the predefined spectral content, to find a candidate image region, detect a spatial pattern in the candidate image region, compare a characteristic of the detected spatial pattern to a corresponding characteristic of a spatial verification pattern, and, if the characteristics match, identify the candidate region as a verified image region corresponding to a marked part of the scene, obtain image data representing the scene, process image data corresponding to the verified image region in a first manner and process remaining image data in a second manner.

The sensor may comprise a first group of sensor elements sensitive to light having the predefined spectral content and a second group of sensors elements insensitive to light having the predefined spectral content.

According to a third aspect of the invention a camera system for monitoring a scene comprises a light source arranged to mark a part of the scene with light having a predefined spectral content and a spatial verification pattern, and a camera as described above.

The camera system may further comprise a temporal modulator arranged to generate a temporal modulation sequence, and transmit the temporal modulation sequence to the illumination unit and the camera in a synchronized manner.

According to a fourth aspect of the invention a computer-readable recording medium is provided having recorded thereon a program for implementing the herein described method when executed on a device having processing capabilities.

These latter aspects of the invention provide corresponding advantages to the first aspect of the invention.

A further scope of applicability of the present invention will become apparent from the detailed description given below. However, it should be understood that the detailed description and specific examples, while indicating preferred embodiments of the invention, are given by way of illustration only, since various changes and modifications within the scope of the invention will become apparent to those skilled in the art from this detailed description.

Hence, it is to be understood that this invention is not limited to the particular component parts of the device described or steps of the methods described as such device and method may vary. It is also to be understood that the terminology used herein is for purpose of describing particular embodiments only, and is not intended to be limiting. It must be noted that, as used in the specification and the appended claim, the articles "a," "an," "the," and "said" are intended to mean that there are one or more of the elements unless the context clearly dictates otherwise. Thus, for example, a reference to "a region" or "the region" may include several regions, and the like. Furthermore, the word "comprising" does not exclude other elements or steps.

BRIEF DESCRIPTION OF THE DRAWINGS

The invention will now be described in more detail by way of example and with reference to the accompanying schematic drawings, in which.

DETAILED DESCRIPTION OF EMBODIMENTS

Figure 1:
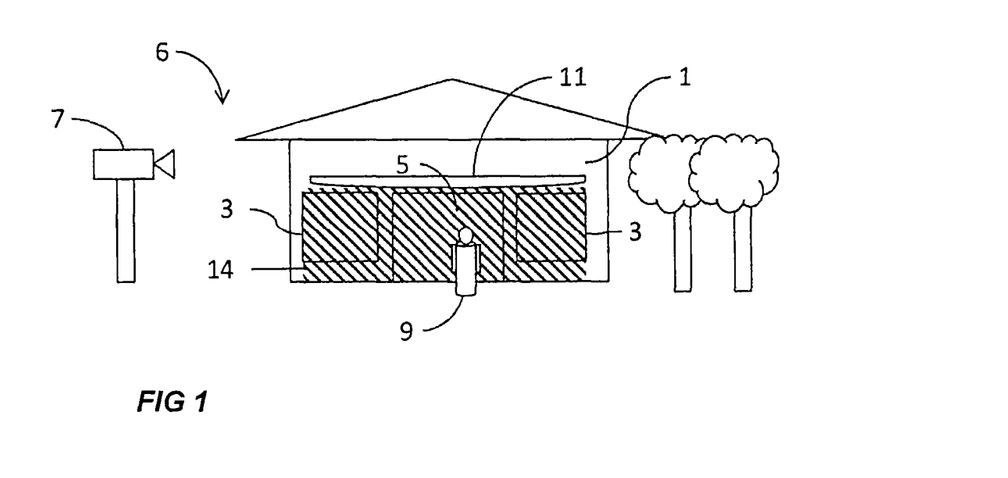
FIG. 1 illustrates a situation where a camera is monitoring a scene.
Figure 2:
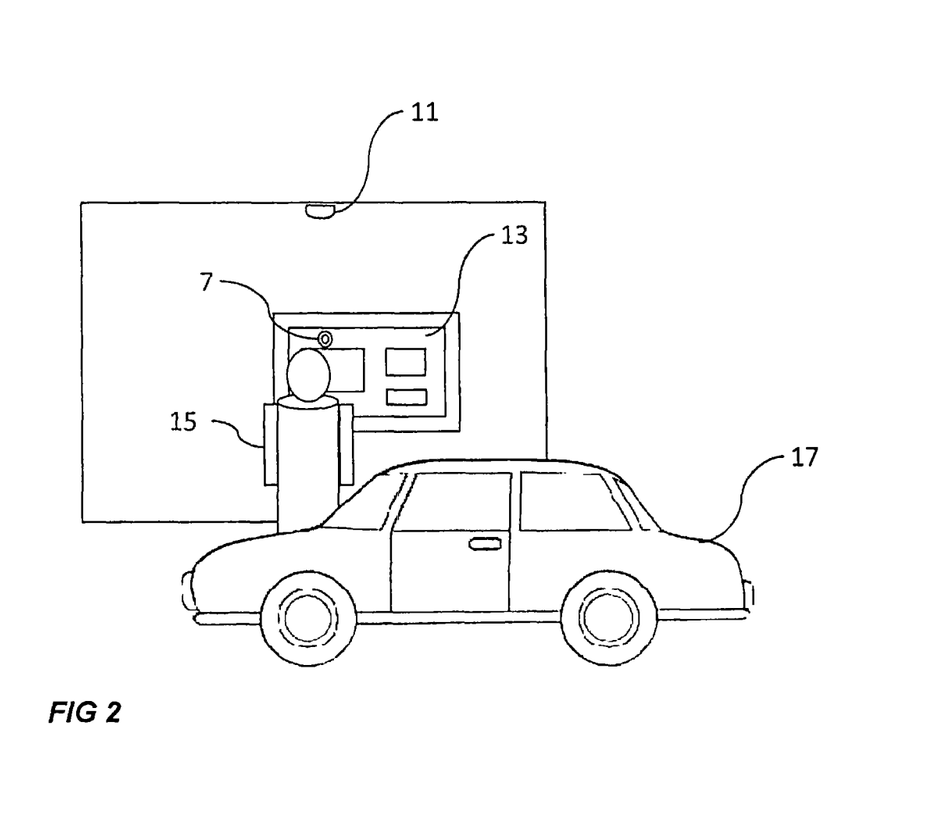
FIG. 2 illustrates another situation where a camera is monitoring a scene.

FIGS. 1 and 2 illustrate two exemplifying situations where the inventive method and apparatus may be used. FIG. 1 shows a building 1 having large windows 3 and a glass door 5 towards a street. The building 1 may e.g. house a shop which is entered through the glass door 5, and people passing by may view the inside of the shop through the glass door 5 and windows 3.

In order to increase the security of the premises at off-hours, a camera system 6 including a camera 7 is monitoring the outside of the building 1, so that e.g. break-in attempts may be discovered and stopped. However, there is no interest in viewing the inside of the shop by the camera 7, both for privacy reasons and to reduce the amount of image processing and video storage needed. This could be solved by overlaying a privacy mask on the captured images which covers an area of the image depicting the door 5 and the windows 3.

A privacy mask is an area of the image which is blurred or greyed out or in some manner not shown to a user. However, as the inventors have realized, this may cause a problem when there are objects 9 of interest in an area between the camera 7 and the actual area to be covered, such as the windows. One example is when there is a need to add a privacy mask to an area in the background without covering any part of the foreground. This is difficult when the privacy mask is defined in the image received from the camera by marking a specific area in the image in a user interface.

A similar situation arises when a store owner needs to monitor areas inside the store but has no permission to monitor the area outside the store. The view to the outside environment, through the store windows and door, therefore needs to be masked by privacy masks in the video from the camera. However, there might still exist interesting parts in the store which are located between the monitoring camera and the door or windows and which should be available for viewing in the video from the camera.

To counter these problems, the inventors have designed a way to physically mark a part of the scene, i.e. in the scene in itself, and use this marking as basis for e.g. a privacy mask. This is accomplished by illuminating the relevant part of the scene with light having predefined characteristics, more specifically light with a predefined spectral content and a spatial verification pattern.

Spectral content should in this context be interpreted as a certain interval or intervals of wavelengths of light, e.g. near-infrared light, NIR, having wavelengths in an interval around 850 nm, such as the interval 750-1000 nm. Another example is ultra-violet light, UV, e.g. having a wavelength around 200 nm. The light may be visible or invisible to the human eye.

The light is emitted according to a spatial verification pattern which may include a chess board like pattern, dots, lines which may have a specified spatial frequency, i.e. number of lines per length unit, etc. The spatial verification pattern may be characterized by different characteristics, e.g. by this spatial frequency, by the line width or the ratio between the line width and the distance in between the lines. If two patterns are to be compared, such a characteristic of each pattern may be generated and used for the comparison. The comparison between the characteristics of two patterns may take place in many different ways, and the characteristic may also be the entire pattern itself, or parts of the pattern.

The light is provided by one or more light sources 11, which are included in the camera system 6. In FIG. 1 the light source 11 is mounted to illuminate the door 5 and the windows 3. The light source 11 may, depending on the scene and the use case, be located in various positions in relation to the scene and the camera. The light source 11 may e.g. be located on or in the vicinity of the camera 7 or it may be located close to the part of the scene which should be marked.

Figure 4:
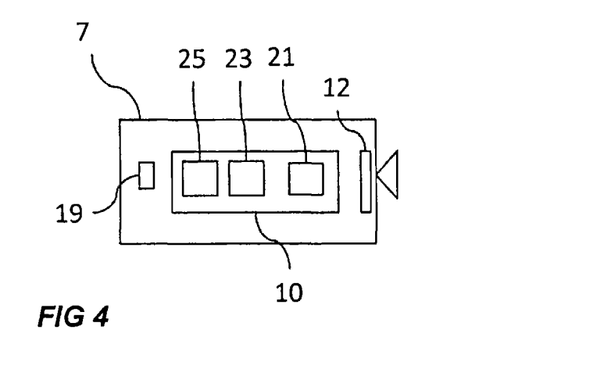
FIG. 4 schematically shows a camera.

As shown in more detail in FIG. 4, the camera 7 comprises an image processing unit 10. The image processing unit 10 is configured to recognize the characteristics of the light provided by the light source 9. The image processing unit 10 may also be located elsewhere, such as in a video encoder or server receiving video from the camera.

The camera captures images by a sensor 12. There are basically two main options for the capture of images in relation to the methods described herein. Either one and the same image may be used both for analyzing, with the purpose of finding the image region corresponding to the marked part of the scene, and for displaying to a user, or two types of images may be used, one which is used for analysis purposes only, and one which is a "normal" image. "Normal" in this context should be understood as an image depicting the scene in a manner usually viewed by a user.

In the context of this application, the image which is used for analysis purposes is denoted analysis image, and the image used for displaying to a user is denoted monitoring image. In the first case, where only one type of image is captured, the terms analysis image and monitoring image would refer to one and the same image.

In the case where two types of images are captured, the sensor 12 may in turn include a first group of sensor elements, which are sensitive to the predefined spectral content of the light from the light source 11 and which thereby capture the analysis image, and a second group of sensor elements, which are insensitive to that same spectral content and, hence, capture the above described monitoring image. This could also be seen as the camera comprising two sensors, one comprising the first group of sensor elements and one comprising the second group of sensor elements.

The sensor elements from the first group may be interspersed among the sensor elements of the second group, or the two groups may be placed in two separate physical locations. The two sensor element groups may e.g. be located in two separate cameras, preferably mounted closely to each other.

One way of achieving the first group of sensor elements and the second group of sensor elements is to filter light reaching the sensor elements of the first group by one or more filters which allow light of the predefined spectral content to pass, but which may remove other part of the spectrum, and filtering light reaching the sensor elements of the second group by one or more filters which remove only the light having the predefined spectral content.

As another alternative a filter may be provided which may be switched on and off to filter out the predefined spectral content, i.e. light from the light source 11, and thereby allow the camera 7 to alternatingly capture images with and without the spectral content included.

All of these options would allow the camera to capture both a first type of images where the light of the predefined spectral content is included and a second type of images where this spectral content is not included, i.e. a "normal" image where the marking of the scene is not visible.

Additionally, the quality of the analysis image may be further improved by controlling the light source 11 to be switched on and off to enable the capturing of a reference image, without the marking from the light source included. This reference image may then be subtracted from the images of the first type to give a clearer picture of a detected spatial pattern. In order for the camera to know when the light is on and when it is off, the light source may inform the camera of the current marking of the scene, or as an alternative, both the light source and the camera may receive this information from another entity and the light source will then be controlled according to this received information. As a third alternative, the camera may generate the information and send corresponding instructions to the light source.

When the analysis image has been captured, this image is segmented, based on the predefined spectral content, by the image processing unit 10, to find any areas which include the predefined spatial content. The found area or areas is denoted candidate image region. The term "candidate" is used to underline that it is not certain at this point whether the found image regions correspond to the light from the light source, this since light having the predefined spectral content could, as discussed previously, have other origin than the light source 11.

A spatial pattern of the candidate image region is then detected, and as described above, a characteristic of the found spatial pattern is compared to a corresponding characteristic of the spatial verification pattern of the light source. In case of a match, the candidate image region is identified as a verified image region corresponding to the marked part of the scene.

The position or coordinates of the verified image region is then used to divide image data of a monitoring image, which is either the same as the analysis image or a separately captured image, into image data corresponding to the marked part of the scene and which is processed in the first manner, and remaining image data, i.e. image data not corresponding to the marked part of the scene, which is processed in the second manner.

The monitoring image may then be presented to a user, after the first and second manner of image processing has taken place.

It may be noted that for the case of a separate monitoring image being captured, the analysis image and the monitoring image usually use the same coordinate system, which makes it possible to easily find the correct image region in the monitoring image. If there is a need to place the two groups of sensor elements further apart from each other, the coordinates of the image region would be transformed from the analysis image to the monitoring image.

Returning now to the illustrated example; thus, when a verified image region of an image which corresponds to a marked part 14 of the scene, i.e. a part of the scene illuminated by the light source 11, is found, this image region will be treated differently to the remaining image by the image processing unit 10. In this specific example, the image region will be blurred or greyed out to provide a privacy mask for those parts of the image depicting the illuminated part of the scene. Note that in this case the object 9 standing just outside the door 5, i.e. between the camera 7 and the glass door 5, will not be covered by the privacy mask, since it is not illuminated by the light from the light source 11.

In FIG. 2 another situation is illustrated where the light source 11 is used to mark a part of a scene for a camera 7. In this example the camera 7 is mounted at an ATM 13, and the purpose is to monitor objects in the immediate vicinity of the ATM, typically an object 15 in the form of a person withdrawing money. Objects outside the immediate vicinity of the ATM 13, such as the object 17 in the form of a car, should not be monitored. For this purpose, the light source 11 provides light with a specific spectral content and a specific spatial verification pattern on the area right in front of the ATM 13, meaning that any object in that area will be marked by the light from the light source 11. This marking is then used to select the corresponding region of the images captured by the camera 7 for a certain type of processing, in this case to be shown to an operator. The remaining part of the image should be ignored and could be greyed out, blurred or replaced with a static image, such as a static, or prestored, background image.

An opposite situation to the one illustrated in FIG. 2 may occur in a store, or at a hotel front desk, equipped with video surveillance and where there is a desire to avoid filming the staff at the counter. In this case the light source is set to illuminate the region where the staff usually is present, and this marked part of the scene is greyed out to provide a privacy mask covering that area.

It may be noted that when referring to "the image region" or "an image region" in the context of the embodiments of the present invention, this should actually be interpreted as incorporating one or more regions of the image, in other words, when referring to "the region of the image" this either means one single group of neighboring pixels or several unconnected groups of neighboring pixels. An example of when the latter may occur is when two objects—persons—are standing close to the camera in the situation illustrated in FIG. 2, and both of these objects are illuminated by the light from the light source. These two objects might then be recognized as two separate groups of pixels marked by the light. These two groups are still referred to as "an image region" or "the image region". Another example is when more than one light source is used to mark different parts of the scene with light having the same characteristics. This will normally also create two separate groups of pixels in the image which are both recognized as corresponding to marked parts of the scene, but in the context of this application, they will still be referred to as one image region. It may be noted that the above reasoning also applies to the term "marked part of scene" as this may include more than one such marked part.

Due to the fact that the light has both a predefined spectral content and a spatial verification pattern which both are recognized by the image processing unit, it is much more difficult for someone to—intentionally or unintentionally—create a "false" marking of a part of the scene by shining a light on a part of a monitored scene. Even though a specific spectral content may be possible to copy, e.g. by finding a light source of the same wavelength range, a spatial pattern is much harder to reproduce. The verification step when the spatial patterns are compared also eliminates, or at least reduces, other problems that could occur, e.g. in case infrared or near infrared light is used for marking during daytime, when the daylight also contains light having that spectral content, or when the marking is used in combination with a regular IR-based illumination unit during night.

The spatial verification pattern may be a signature pattern which is associated with a specific camera, and the camera may in turn be preset, e.g. during production, to recognize a specific signature pattern, or characteristics of such a pattern. The spatial verification pattern may also be a joint signature pattern associated with a group of cameras monitoring the same scene. This could e.g. be useful when several cameras are setup to monitor one and the same scene from different angles, where part of the scene is to be covered by a privacy mask, such as if a second camera were to be added to the setup illustrated in FIG. 1, and the inside of the store were to be hidden from view in both cameras.

A camera or a group of cameras could also be delivered in a kit with several light sources which all have the same characteristics. As another alternative, one or more cameras could be set to recognize light characteristics from several different light sources, such that one light source is used to mark a part of the scene where the cameras should ignore motion and another light source is used to mark a part of the scene to create a privacy mask for that part of the scene.

In order to even further reduce the risk of a false marking being created, a temporal pattern could be added to the light. This is accomplished by temporally modulating or varying the light according to a set scheme which may be denoted a temporal modulation sequence. Such a temporal modulation sequence may e.g. be generated based on a pseudo-random sequence. The temporal modulation sequence could e.g. include a variation of the strength of the light according to a predetermined scheme by switching on and off the light source or it could include varying the spatial verification pattern between at least a first and a second spatial verification pattern. The variation or shifting of the pattern between a first and a second spatial verification pattern may be achieved by including a spatial light modulator in the light source. Such a spatial light modulator may include some type of filter for providing more than one spatial verification pattern. The filter may e.g. be provided in the form of a liquid crystal arrangement. Another alternative is to use more than one light source element in the light source, and provide each such light source element with some type of filter or other arrangement such as a number of light emitting elements in a specific pattern, for providing a specific spatial verification pattern.

The described steps of marking the part of the scene, capturing and segmenting an analysis image, detecting a spatial pattern in a candidate image region and comparing the detected spatial pattern to the spatial verification pattern would then be performed repeatedly, but with different patterns in accordance with the temporal modulation sequence.

The temporal modulation sequence may be generated by a temporal modulator 19, which is illustrated in FIG. 4 as part of the camera. The temporal modulator 19 may also be placed at another location in the camera system, e.g. at the light source or another location. The temporal modulator 19 sends information to the light source 11 of the temporal modulation sequence that should be used when marking the scene, and the image processing unit 10 receives the same information in order to perform the comparison between the characteristics of the patterns correctly.

The comparison of characteristics may in this case take into account different relationships between characteristics in the first and the second spatial verification pattern. As one example, a ratio between the spatial frequencies of a detected pattern, e.g. the spatial frequency of the lines in such a pattern, and the corresponding spatial frequency of a previously detected pattern, may be compared to a corresponding ratio of the respective spatial frequencies of a first and a second spatial verification pattern. In this process wavelet decomposition could be utilized. The comparison between the characteristics of the spatial patterns could also be performed in smaller patches of pixels in the image. This type of comparison also solves the possible problem that the projected pattern on objects in the scene may appear different depending on their distance from the monitoring camera and the light source. In case the scene includes moving objects it would be preferable to perform the shift between the patterns at a pace fast enough to be able to capture both patterns at the object when the object still is at approximately the same distance from the camera, in order to get a result in the comparison which is unaffected by the detected spatial patterns appearing to be different at different distances from the camera or the light source.

Figure 3:
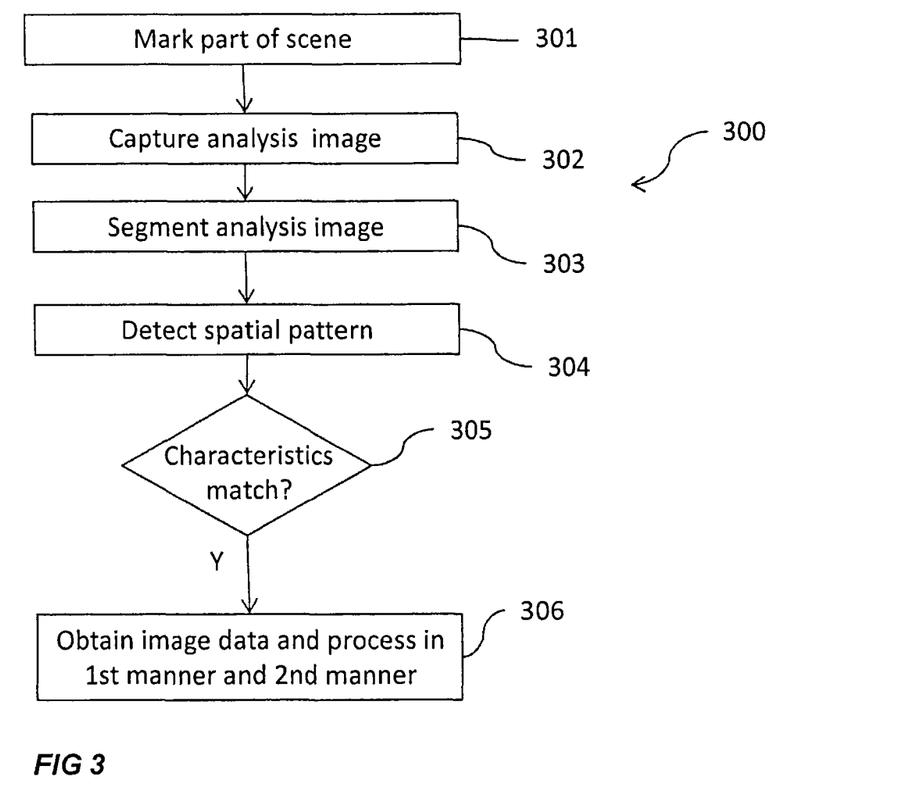
FIG. 3 illustrates a method according to the invention.

In FIG. 3 a method 300 according to embodiments of the present invention is illustrated. In step 301 a part of the scene is marked by light having a predefined spectral content and a spatial verification pattern. In step 302 an analysis image is captured. In step 303 the analysis image is segmented based on the predefined spectral content to find a candidate image region, potentially corresponding to the marked part of the scene.

In step 304 a spatial pattern of the candidate image region is detected and in step 305 a characteristic of the detected spatial pattern is compared to a corresponding characteristic of the spatial verification pattern. In case of a match between the characteristics, the candidate image region is identified as a verified image region and the method continues to step 306 where image data is obtained, either from the analysis image or from a possibly separately captured monitoring image, and processed. The image data which corresponds to the verified image region is processed in a first manner and the remaining image data is processed in a second manner. The second manner of processing is different from the first manner.

The division of the image data into image data corresponding to the verified image region, which in turn corresponds to the marked part of the scene, and the remaining image data, which corresponds to the non-marked part of the scene, may be used for several different purposes. Apart from the above mentioned options of creating privacy masks, there are a number of other options where this division could be useful. All of the different options may be combined as desired.

One example is to use this division of the image data to at least partly optimize imaging parameters for one part of a scene while ignoring the remaining scene. In other words one of the first or the second manner of processing includes setting imaging parameters, such as color scheme, brightness or white balance, for the entire image, i.e. the found image region plus the remaining image, based on only one of the verified image region or the remaining image. In this way an image is achieved which depicts the chosen part of the scene in the best way possible while allowing less interesting parts to be e.g. too bright or too dark.

As another example, a motion detection unit 21 may be set to detect motion only in one of the found image region or the remaining image. This may e.g. be used to avoid detecting motion from trees swaying in the wind or similar.

An object detection unit 23 may in the same way be set to detect objects only in one of the verified image region or the remaining image. The object detection unit could e.g. be set to detect or identify a human or an animal, a face, a license plate, text or visual information. This option could be useful is when it is desired to detect motion or objects only in areas in a store where very valuable items are displayed and thereby make it possible to alert staff that they should pay attention to that area. The specific store area or areas are illuminated by light having the predefined characteristics and object and/or motion detection is set to take place only in those areas. Additionally or alternatively, an object tracking unit 25 could be set to track object only in one of the verified image region or the remaining image.

The motion detection unit 21, the object detection unit 23 and the object tracking unit may be parts of the image processing unit 10, as illustrated in FIG. 4, or they may be embodied as separate units. They may be arranged in the camera 7 or in the camera system 6 or at another location, such as in a video encoder or server.

It will be appreciated that a person skilled in the art can modify the above described embodiments in many ways and still use the advantages of the invention as shown in the embodiments above. As an example, the various units described herein could be embodied in software or hardware or a combination thereof.

Thus, the invention should not be limited to the shown embodiments but should only be defined by the appended claims.

LIST OF REFERENCE NUMERALS

1: Building
3: Windows
5: Door
7: Camera
9: Object
10: Image processing unit
11: Light source
12: Sensor
13: ATM
14: Marked part of scene
15: Object
17: Object
19: Temporal modulator
21: Motion detection unit
23: Object detection unit
25: Object tracking unit

The invention claimed is:

1. A method of masking part of an image of a scene captured by a camera monitoring the scene, comprising:
mounting a light source and marking a part of the scene with light having a predefined spectral content and a spatial verification pattern,
capturing an analysis image of the scene by a sensor sensitive to the predefined spectral content,
segmenting the analysis image, based on the predefined spectral content, to find a candidate image region,
detecting a spatial pattern in the candidate image region,
comparing a characteristic of the detected spatial pattern to a corresponding characteristic of the spatial verification pattern, and, if the characteristic of the detected spatial pattern and the corresponding characteristic of the spatial verification pattern match,
identifying the candidate image region as a verified image region corresponding to the part of the scene which is illuminated by the light source,
obtaining image data representing the scene, and
hiding image data, corresponding to the verified image region, from being displayed, by blurring or substituting, and displaying remaining image data, thereby providing a privacy mask for the part of the scene which is illuminated by the light source, or displaying image data corresponding to the verified image region, and hiding remaining image data from being displayed, by blurring or substituting, thereby providing a privacy mask for a non-illuminated part of the scene,
modulating the spatial verification pattern between at least a first and a second spatial verification pattern according to a temporal modulation sequence, and
with a respective one of the first and the second spatial verification pattern, in accordance with the temporal modulation sequence, repeating said marking, said capturing, said segmenting, said detecting and said comparing.

2. The method of claim 1, further comprising capturing a monitoring image by a sensor insensitive to the predefined spectral content, and wherein the image data representing the scene is obtained from the monitoring image.

3. The method of claim 1, wherein the spatial verification pattern is a signature pattern associated with one or more cameras.

4. The method of claim 1, wherein the characteristic of the detected spatial pattern is a ratio between a spatial frequency of a detected pattern and a spatial frequency of a previously detected pattern, and the characteristic of the spatial verification pattern is a ratio between a spatial frequency of the first spatial verification pattern and a spatial frequency of the second spatial verification pattern.

5. The method of claim 1, wherein the temporal modulation sequence is generated based on a pseudo-random sequence.

6. The method of claim 4, wherein the temporal modulation sequence is generated based on a pseudo-random sequence.

7. The method of claim 1, wherein a prestored background image is used for the substituting.

8. The method of claim 1,
wherein the image data corresponding to the verified image region is included in input to motion detection circuitry, and the remaining image data is excluded from input to the motion detection circuitry, or
wherein the remaining image data is included in input to motion detection circuitry, and the image data corresponding to the verified image region is excluded from input to the motion detection circuitry.

9. The method of claim 1,
wherein the image data corresponding to the verified image region is included in input to object detection circuitry arranged to detect or identify a human, an animal, a vehicle, a license plate, text or visual information, or other object type, and wherein the remaining image data is excluded from input to the object detection circuitry, or,
wherein the remaining image data is included in input to object detection circuitry arranged to detect or identify a human, an animal, a vehicle, a license plate, text or visual information, or other object type, and wherein the image data corresponding to the verified image region is excluded from input to the object detection circuitry.

10. The method of claim 1, wherein the image data representing the verified image region is compressed at a first compression rate, wherein the remaining image data is compressed at a second compression rate, and wherein the first compression rate is different from the second compression rate.

11. A camera system for monitoring a scene, comprising:
a light source mounted to mark a part of the scene with light having a predefined spectral content and a spatial verification pattern; and
a camera arranged to monitor the scene, the camera comprising:
a sensor arranged to sense a predefined spectral content and capture an analysis image of the scene, and
image processing circuitry configured to:
segment the analysis image, based on the predefined spectral content, to find a candidate image region,
detect a spatial pattern in the candidate image region,
compare a characteristic of the detected spatial pattern to a corresponding characteristic of a spatial verification pattern, and, if the characteristic of the detected spatial pattern and the corresponding characteristic of the spatial verification pattern match,
identify the candidate region as a verified image region corresponding to a part of the scene illuminated by a light source with light having the predefined spectral content and the spatial verification pattern, obtain image data representing the scene, and hide image data, corresponding to the verified image region, from being displayed, by blurring or substituting, and display remaining image data, to thereby provide a privacy mask for the part of the scene which is illuminated by the light source, or display image data corresponding to the verified image region, and hide remaining image data from being displayed, by blurring or substituting, to thereby provide a privacy mask for a non-illuminated part of the scene, wherein the spatial verification pattern between at least a first and a second spatial verification pattern is modulated according to a temporal modulation sequence, and the marking, capturing, segmenting, detecting, and comparing are repeated with a respective one of the first and the second spatial verification pattern, in accordance with the temporal modulation sequence.

12. The camera system of claim 11, wherein the sensor comprises a first group of sensor elements sensitive to light having the predefined spectral content and a second group of sensor elements insensitive to light having the predefined spectral content.

13. The camera system of claim 11, further comprising a temporal modulator configured to generate the temporal modulation sequence, and transmit the temporal modulation sequence to the light source and the camera in a synchronized manner.

* * * * *